(12) United States Patent
Tang et al.

(10) Patent No.: US 11,382,285 B2
(45) Date of Patent: Jul. 12, 2022

(54) WIRELESS INTERCONNECTION CONTROL SYSTEM AND METHOD FOR IMPROVING SPRINKLER IRRIGATION UNIFORMITY OF HOSE REEL IRRIGATOR WITH ELECTRIC DRIVE

(71) Applicant: JIANGSU UNIVERSITY, Zhenjiang (CN)

(72) Inventors: Lingdi Tang, Zhenjiang (CN); Lei Yang, Zhenjiang (CN); Yue Tang, Zhenjiang (CN)

(73) Assignee: Jiangsu University, Jiangsu (CN)

( * ) Notice: Subject to any disclaimer, the term of this patent is extended or adjusted under 35 U.S.C. 154(b) by 246 days.

(21) Appl. No.: 16/623,688

(22) PCT Filed: Nov. 16, 2018

(86) PCT No.: PCT/CN2018/115815
§ 371 (c)(1),
(2) Date: Dec. 17, 2019

(87) PCT Pub. No.: WO2020/000871
PCT Pub. Date: Jan. 2, 2020

(65) Prior Publication Data
US 2021/0329860 A1  Oct. 28, 2021

(30) Foreign Application Priority Data
Jun. 27, 2018 (CN) .......................... 201810674523.2

(51) Int. Cl.
*A01G 25/16* (2006.01)
*G05B 19/042* (2006.01)
*A01G 25/02* (2006.01)

(52) U.S. Cl.
CPC ............. *A01G 25/16* (2013.01); *A01G 25/02* (2013.01); *G05B 19/0423* (2013.01); *G05B 2219/15117* (2013.01); *G05B 2219/2625* (2013.01)

(58) Field of Classification Search
CPC ...... A01G 25/16; A01G 25/02; A01G 25/095; G05B 19/0423; G05B 2219/15117;
(Continued)

(56) References Cited

FOREIGN PATENT DOCUMENTS

| CN | 102487789 A | * | 6/2012 |
|----|-------------|---|--------|
| CN | 102487789 A |   | 6/2012 |

(Continued)

OTHER PUBLICATIONS

English Translation of International Search Report corresponding to International Patent Application No. PCT/CN2018/115815 dated Mar. 29, 2019.
(Continued)

*Primary Examiner* — Darrin D Dunn
(74) *Attorney, Agent, or Firm* — Jenkins, Wilson, Taylor & Hunt, P.A.

(57) ABSTRACT

The present invention provides a wireless interconnection control system for improving sprinkler irrigation uniformity of hose reel irrigator with electric drive comprising a micro processing controller module, a frequency converter, a water pump AC motor, a pressure transmitter, a GPRS wireless transmission module, a mobile phone client APP, and a coding speed detection module. The microprocessor controller module and the frequency converter form a pressure PID controller to indirectly control the constant nozzle inlet pressure by controlling the pressure of the incoming pressure of the hose reel irrigator. The microprocessor controller module and the matching motor controller with brushless DC motor form a speed PID controller to directly control the
(Continued)

reel back speed of the PE pipe. The GPRS wireless transmission module interactively communicates the nozzle inlet pressure, the reel back speed of the PE pipe and the mobile phone client APP through the short message mode. After setting the corresponding parameters, the system realizes the automatic adjustment of the working conditions, improves the uniformity of the sprinkler irrigation operation of the hose reel irrigator, and realizes the remote real-time and precise monitoring of the working conditions of the hose reel irrigator, which provides a front-end guarantee for the intelligent irrigation of the irrigator.

8 Claims, 3 Drawing Sheets

(58) Field of Classification Search
CPC .. G05B 2219/2625; G05B 2219/25257; Y02A 40/22
See application file for complete search history.

(56) References Cited

FOREIGN PATENT DOCUMENTS

| | | | | |
|---|---|---|---|---|
| CN | 204539835 U | | 8/2015 | |
| CN | 205124336 U | | 4/2016 | |
| CN | 205483378 U | * | 8/2016 | |
| CN | 105961152 A | * | 9/2016 | |
| CN | 105961152 A | | 9/2016 | |
| CN | 106171864 A | | 12/2016 | |
| CN | 108628224 A | | 10/2018 | |
| EP | 0004371 A1 | | 10/1979 | |
| EP | 1211784 A1 | * | 6/2002 | ............... H02K 5/06 |
| EP | 2147592 A1 | | 1/2010 | |

OTHER PUBLICATIONS

English Translation of IPRP and Written Opinion corresponding to International Patent Application No. PCT/CN2018/115815 dated Dec. 29, 2020.

* cited by examiner

WIRELESS INTERCONNECTION CONTROL SYSTEM AND METHOD FOR IMPROVING SPRINKLER IRRIGATION UNIFORMITY OF HOSE REEL IRRIGATOR WITH ELECTRIC DRIVE

TECHNICAL FIELD

The present invention relates to the fields of wireless monitoring and motor control. Specifically, it relates to wireless interconnection control system and method for improving sprinkler irrigation uniformity of hose reel irrigator with electric drive.

BACKGROUND

The hose reel irrigator is an important high-efficiency, water-saving irrigation equipment. The uniformity coefficient of sprinkler irrigation is one of the important indicators reflecting the sprinkler irrigation. According to the requirements of GB 50085-2007 "Technical code for sprinkler irrigation engineering Part 4: Technical parameters of sprinkler irrigation", the uniformity coefficient of sprinkler irrigation of the travelling sprinkler irrigation system should not be lower than 0.85.

The important factors affecting the sprinkler irrigation uniformity of the hose reel irrigator are the nozzle inlet pressure and back reel speed of the sprinkler cart. The patent (CN 105961152A) discloses a speed control system based on brushless DC motor and APP, which uses the brushless DC motor instead of the water turbine to realize the uniform recovery of the sprinkler cart but does not consider the effect of the change in the nozzle inlet pressure on the uniformity of sprinkler irrigation caused by the resistance loss of the PE pipe. The patent (CN106171864A) discloses an intelligent electric hose reel irrigator, which is provided with an inlet pressure detecting device of the hose reel irrigator but does not control the nozzle inlet pressure. If the pressure transmitter is installed at the nozzle inlet and the wireless data transmission module is used to communicate between the pressure transmitter and the frequency converter that controls the pump motor speed, additional power is required for the pressure transmitter and the wireless data transmission module, and then additional cost and trouble in use are brought. So far, it has not been found in the literature to achieve the constant inlet pressure of the nozzle by controlling the inlet pressure of the hose reel irrigator and then improve the sprinkler irrigation uniformity.

Contents of the Invention

In view of the deficiencies in the prior art that the uniformity reduction of the sprinkler irrigation caused by the change of the nozzle inlet pressure of the hose reel irrigator, the present invention provides a wireless interconnection control system for improving sprinkler irrigation uniformity of hose reel irrigator with electric drive.

The present invention achieves the above technical objects by the following technical means.

A wireless interconnection control system for improving sprinkler irrigation uniformity of hose reel irrigator with electric drive, including microprocessor controller module, wireless data transmission module, STC singlechip module, frequency converter, water pump motor, pressure transmitter, GPRS wireless transmission module, mobile phone client APP, and encoder. The microprocessor controller module communicates with the wireless data transmission module through the USART serial port, and the wireless data transmission module uses the USART serial port to communicate with the STC singlechip module. The STC singlechip module is connected to the frequency converter through the I/O port, and the water pump is connected to the water source and the hose reel irrigator through the water pipe. The input end of the microprocessor controller module is connected to the pressure transmitter, and the pressure transmitter is installed on the outer wall of the hose reel irrigator. The microprocessor controller module is connected to the GPRS wireless transmission module through a serial port, and the GPRS wireless transmission module communicates with the mobile phone client APP. The microprocessor controller module is further connected to the brushless DC motor controller and the brushless DC motor through the I/O port. The encoder for detecting the rotational speed of the brushless DC motor is mounted on the output shaft of the brushless DC motor, and the encoder is connected to the input end of the microprocessor controller module.

Further, the microprocessor controller module includes a serial port transceiver module, a speed control signal conditioning module, and an alarm monitoring module. The serial port transceiver module is configured to implement communication between the microprocessor controller module and the frequency converter and the GPRS wireless transmission module. The speed control signal conditioning module, the brushless DC motor controller and the brushless DC motor form a speed PID controller to adjust the brushless DC motor speed. The alarm monitoring module monitors the status of the PE pipe and the nozzle inlet pressure when the hose reel irrigator is in operation, and alerts the user when an abnormal situation occurs. The PE pipe state includes an uncoiled length, a number of coiled layers, and a number of coiled turns. The nozzle inlet pressure is obtained by subtracting the pressure loss of the PE pipe from the incoming pressure of the machine, and the pressure loss of the PE pipe comprises a dynamically changing uncoiled portion and a helically coiled portion, which are obtained from the test. Since the existing calculation model cannot entirely accurate calculate the pressure loss of the coiled PE pipe, the method of measuring the pressure loss data of PE pipes with different specifications and different lengths in advance is more reliable. During the test, pressure gauges are installed at the machine inlet and the nozzle inlet, and a flow meter is installed between the water supply pump and the inlet of hose reel irrigator. Firstly, the PE pipe is completely pulled out and uncoiled, so that the number of coiled turns C is 0. The irrigator incoming pressure $p_{10}$ is measured, the difference between the incoming pressure of the irrigator and the nozzle inlet pressure under different working flows $Q_i$ (i=0, 1, 2 . . . ) is measured, then $p_{10}=f(Q_i)$ and $\Delta p_{10}=f(Q_i)$ are obtained. Secondly, the PE pipe is coiled one turn (C=1) onto the reel. The incoming pressure of the irrigator $p_{11}$ is measured, the difference between the incoming pressure of the irrigator and the nozzle inlet pressure under different working flows $Q_i$ (i=0, 1, 2 . . . ) is measured, then $p_{11}=f(Q_i)$ and $\Delta p_{11}=f(Q_i)$ are obtained. Thirdly, the PE pipe is coiled 2 turns (C=2), 3 turns(C=3), . . . , until the PE pipe is completely coiled onto the reel. In this way, the pressure loss data $p_{1C}=f(Q_i)$ and $\Delta p_{1C}=f(Q_i)$ are obtained, when the PE pipe with a certain specification is coiled in different turns. Using the same method, a dynamic pressure loss database of PE pipes with different specifications can be established. In actual use, the corresponding flow rate Q at that time is determined by $p_{1C}=f(Q_i)$ from the current pressure value pic of the number of coiled turns of the PE pipe, and the compensation value and the correction value of the irrigator incoming pressure are determined by $\Delta p_{1C}=f(Q_i)$. The control pressure of the pump motor frequency converter is reset by the wireless data transmission module, then the water pump motor is controlled to increase the water supply pressure to compensate the inlet pressure, so that the nozzle pressure is constant.

Further, the wireless data transmission module, the STC singlechip module, the frequency converter and the microprocessor controller module form a pressure PID controller to control the incoming pressure of the hose reel irrigator.

Further, the GPRS wireless transmission module includes a short message transceiver module, which interacts with the mobile phone client APP to work with various working condition information of the hose reel irrigator.

Further, the mobile phone client APP comprises a parameter setting interface of the hose reel irrigator and a working condition real-time display interface of the hose reel irrigator.

Further, the microprocessor controller module is an STM32F103RBT6 processor, the pressure transmitter is a series AS-131 diffusion silicon pressure transmitter, the GPRS wireless transmission module adopts an ATK-SIM800C module, and the wireless data transmission module is a WSN-02 wireless data transmission module.

A wireless interconnection control method for improving sprinkler irrigation uniformity of hose reel irrigator with electric drive, comprising the following steps:

1), Open the mobile phone client APP, select SMS mode to enter the hose reel irrigator setting interface, set the nozzle inlet pressure, reel back speed of the PE pipe, GPRS wireless transmission module, and SIM card number, then the mobile phone client APP sends the settings to a GPRS wireless transmission module of the specified number.

2), After receiving the information of the mobile phone client APP, the GPRS wireless transmission module transmits the pressure and speed values to the microprocessor controller module, and the microprocessor controller module starts the hose reel irrigator.

3), The pressure transmitter sends a pressure signal to the microprocessor controller module, the microprocessor controller module remotely sends this pressure control signal to the STC singlechip module through the wireless data transmission module, and then the STC singlechip module transmits this pressure control signal to the frequency converter. The pressure PID controller composed of the microprocessor controller module, the wireless data transmission module, the STC singlechip module and the frequency converter performs pressure PID calculation on the pressure signal and the set pressure value, and regulates the pump motor speed to control the incoming pressure of the hose reel irrigator.

4), The set reel back speed of the PE pipe and brushless DC motor real-time speed from the speed monitoring module in the microprocessor controller module are performed PID calculation, and the brushless DC motor speed is adjusted.

5), The microprocessor controller module transmits the received pressure transmitter real-time pressure signal and the encoder real-time speed signal to the mobile phone client APP through the GPRS wireless transmission module. The relevant parameters are displayed on the working condition real-time display interface of the hose reel irrigator, and the user can monitor the operating conditions in real time and make corresponding adjustments.

The beneficial effects of the present invention compared to the prior art are as follows:

1. A wireless interconnection control system for improving sprinkler irrigation uniformity of hose reel irrigator with electric drive is designed. Through the pressure loss rule of the PE pipe from the measurement, the incoming pressure of the hose reel irrigator is controlled to indirectly control the constant nozzle inlet pressure, which breaks through the limitation of the traditional direct control of nozzle inlet pressure. It provides a new idea for the measurement and control field of the hose reel irrigator, which reduces the maintenance and replacement frequency of the equipment and greatly saves the agricultural irrigation cost. Under the premise of using the brushless DC motor to ensure that the PE pipe drives the sprinkler car to recover at a constant speed, the sprinkler irrigation uniformity of the hose reel irrigator is improved.

2. The on-site parameters are presented to the operator in real time and accurately through the working condition display interface of the mobile phone client APP, then users can remotely and intensively complete the control of the sprinkler irrigation operations for multiple sets of irrigators, which provides a front-end guarantee for the intelligent irrigation of the irrigator.

Figure 1:
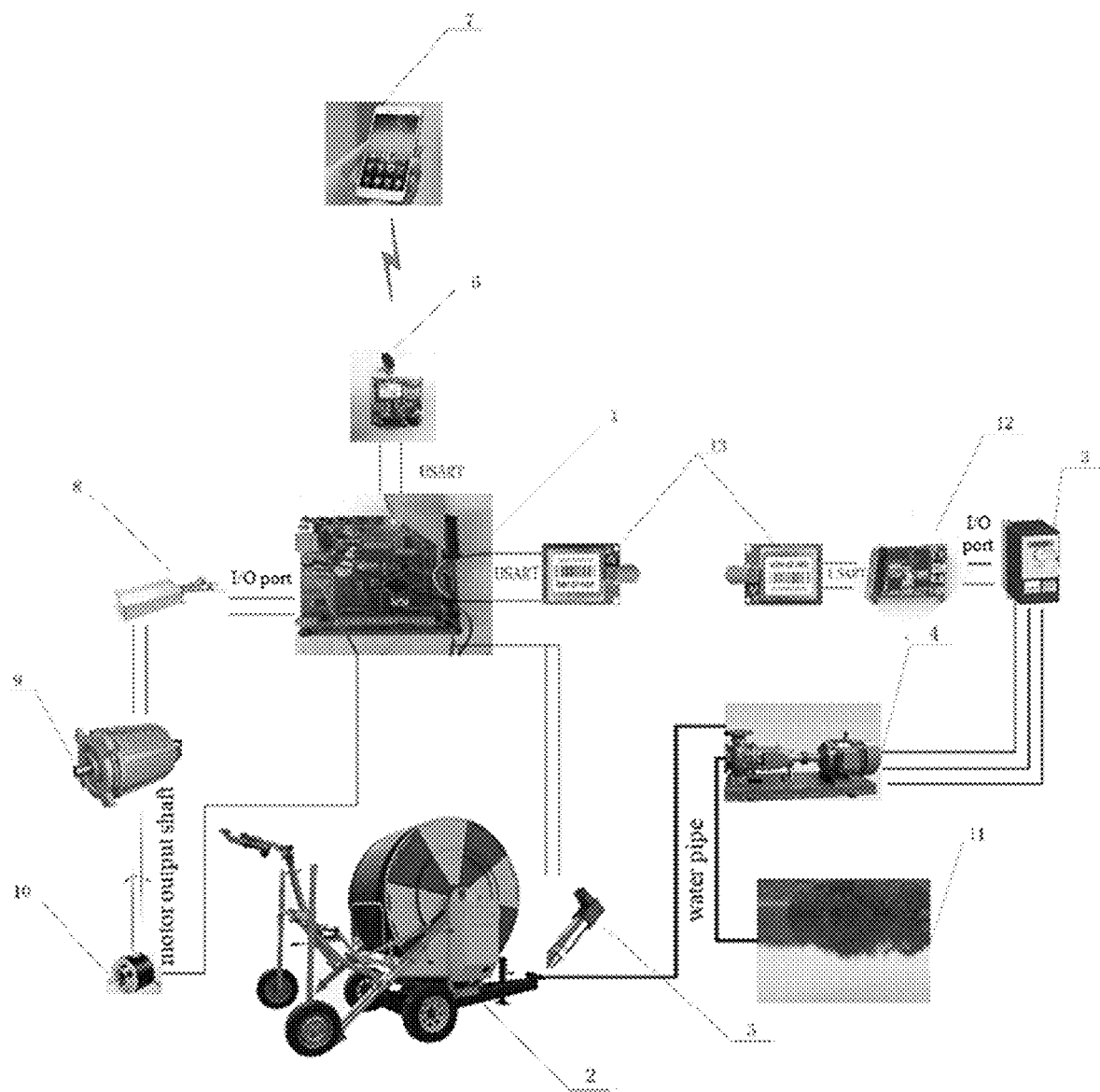
FIG. 1 is a block diagram showing the connection of the control system of the present invention.

The reference numerals are as follows: 1—microprocessor controller module, 2—hose reel irrigator, 3—frequency converter, 4—pump motor, 5—pressure transmitter, 6—GPRS wireless transmission module, 7—mobile phone client APP, 8—brushless DC motor controller, 9—brushless DC motor, 10—encoder, 11—water source, 12—STC singlechip module, 13—wireless data transmission module.

EMBODIMENTS

The present invention will be further described below according to the drawings and embodiments, but the protection scope of the present invention is not limited thereto.

An overall structure of a wireless interconnection control system for improving sprinkler irrigation uniformity of hose reel irrigator with electric drive is shown in FIG. 1, including a microprocessor controller module 1, a hose reel irrigator 2, a wireless data transmission module 13 (wireless data transmission module WSN-02), STC singlechip module 12, frequency converter 3, water pump motor 4, pressure transmitter 5 (series AS-131 diffused silicon pressure transmitter), GPRS wireless transmission module 6 (ATK-SIM800C module), mobile phone client APP 7, brushless DC motor controller 8, brushless DC motor 9, encoder 10 and water source 11. The microprocessor controller module 1 and the GPRS wireless transmission module 6 are mounted on the chassis of the hose reel irrigator 2, In the hose reel irrigator 2, the microprocessor controller module STM32F103RBT6 is used as the main controller. The microprocessor controller module 1 communicates with the wireless data transmission module 13 through the USART serial port (using the TTL protocol), the wireless data transmission module 13 communicates with the STC singlechip module 12 through the USART serial port (using the TTL protocol), and the STC singlechip module 12 communicates with frequency converter 3 through I/O port. The water pump motor 4 is respectively connected to the water source 11 and the hose reel irrigator 2 through water pipes, the frequency converter 3 controls the water pump motor speed 4 by changing the input frequency, the incoming pressure of the hose reel irrigator is measured by a pressure transmitter 5 installed on the outer wall of the inlet pipe of the hose reel irrigator 2, and the pressure transmitter 5 is connected to the input of the microprocessor controller module 1 to transmit the pressure signal to the microprocessor controller module 1 in real time. The brushless DC motor 9 for the hose reel irrigator 2 is used instead of a water turbine as a driving device to rotate the reel and control the reel back speed of the PE pipe; The frequency converter 3, the wireless data transmission module 13, the STC singlechip module 12 and the microprocessor controller module 1 constitute a pressure PID controller. The pressure PID controller receives the pressure signal from the pressure transmitter 5, performs PID calculation according to the set value, sends the instruction to the frequency converter 3 to adjust the input voltage of the water pump motor 4 to change the speed of the water pump motor 4, and controls the incoming pressure of the hose reel irrigator. The GPRS wireless transmission module 6 includes a short message transceiver module, which interacts with the mobile phone client APP 7 to work with various working condition information of the hose reel irrigator 2.

The microprocessor controller 1 includes a speed control signal conditioning module, a serial port data transceiver module, and an alarm monitoring module. The serial port transceiver module is configured to implement communication between the microprocessor controller module 1 and the wireless data transmission module 13, and communication between the microprocessor controller module 1 and the GPRS wireless transmission module 6; The microprocessor controller module 1 communicates with the wireless data transmission module 13 through the serial port 3 of the serial data receiving transceiver module (using the TTL protocol), and the wireless data transmission module 13 communicates with the serial port of the STC microcontroller module 12 (using the TTL protocol). The STC MCU module 12 communicates with the inverter 3 through the I/O port. The frequency converter 3, the wireless data transmission module 13, the STC singlechip module 12 and the microprocessor controller module 1 constitute a pressure PID controller. The pressure transmitter 5 measures the real-time pressure value of the water inlet of the hose reel irrigator, outputs the 4-20 mA analog signal. And this analog signal is converted into a digital signal by the ADC module inside the microprocessor controller 1. Then the different between the converted digital signal and the set pressure value of the PE pipe local and frictional resistance loss models is calculated in the arithmetic module of the microprocessor controller 1, and the percentage is also calculated relative to the set pressure value. When the calculated percentage exceeds the given pressure error band (±2%), the microprocessor controller 1 transmits the real-time pressure value and the set pressure value to the wireless data transmission module 13 through the serial port 3 (using the TTL protocol). The wireless data transmission module 13 transmits the received signal to the STC singlechip module 12 through the serial port (using the TTL protocol), and the STC singlechip module 12 parses the received digital signal into an analog signal and inputs it to the frequency converter 3 through the I/O port. The built-in arithmetic module of the frequency converter 3 calculates the difference between the actual pressure sent by the pressure transmitter 5 and the set pressure of the PE pipe local and frictional resistance loss models, then obtains the pressure deviation and the change rate over time as an input.

The pressure PID controller adjusts the output speed of the pump motor by controlling the input voltage frequency of the pump motor 4 to realize the online adjustment of the incoming pressure of the hose reel irrigator. Speed control signal conditioning module, brushless DC motor 9, and brushless DC motor controller 8 constitutes a speed PID controller. PID calculation is performed according to the speed value set by the mobile phone client APP 7 and the real-time speed of the brushless DC motor 9, and the input voltage of the brushless DC motor 9 is changed to adjust the rotational speed of the brushless DC motor. The alarm monitoring module monitors the state of the PE pipe and the nozzle inlet pressure during the operation of the hose reel irrigator 2. The state of the PE pipe includes the uncoiled length, the number of coiled layers and the number of coiled turns. When either the PE pipe of the hose reel irrigator is nearly fully uncoiled or coiled, or the PE pipe cannot be normally coiled because of encountering obstacles in the working area, or that the water pipe of the hose reel irrigator is blocked results in the abnormal pressure of the nozzle inlet, the alarm monitoring module sends an alarm message to the GPRS wireless data transmission module through the serial port data transceiver module, and then transmits it to the mobile phone client APP 7 to send an alarm SMS to remind the user.

The encoder 10 mounted on the output shaft of the brushless DC motor 9 converts the measured rotational speed into a stable pulse voltage analog signal. The speed PID controller configures the corresponding I/O port to monitor the reel back speed of the PE pipe in real time for the input capture mode, and adjusts the output rotational speed through the serial port 1 of the serial data transceiver module to maintain the stable reel back speed.

The GPRS wireless transmission module 6 and the serial data transceiver module of the microprocessor controller 1 are connected to each other through the serial port 2 to complete data exchange. After the relevant parameters in the operation interface of the mobile phone client APP 7 is set by user, the control command is sent to the GPRS wireless transmission module 6 by means of SMS package, and then reaches the microprocessor controller module 1 via the serial port 2 to complete the corresponding control function; During the operation of hose reel irrigator 2, the real-time incoming pressure of the hose reel irrigator and the speed data of brushless DC motor 9 are sent to the mobile phone client APP 7 via the serial port 2 and the GPRS wireless transmission module 6 to realize real-time display of work status.

Figure 2:
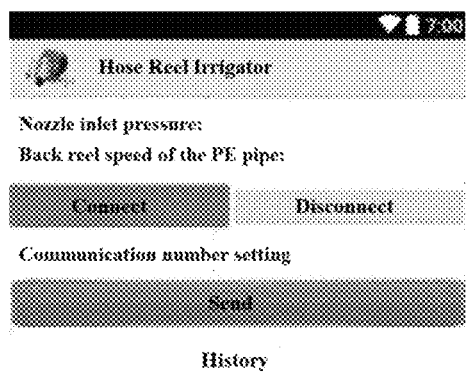
FIG. 2 is a parameter setting interface of the mobile phone client APP of the system.
Figure 3:
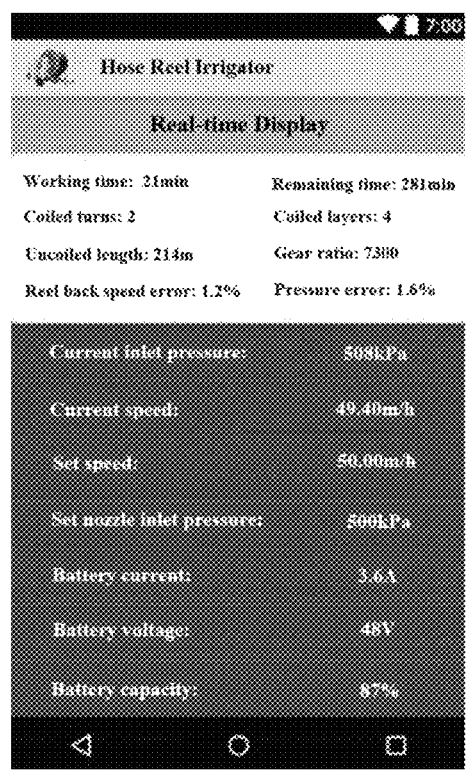
FIG. 3 is a working condition real-time display interface of the mobile phone client APP of the system.

The mobile phone client APP 7 includes a parameter setting interface of the hose reel irrigator (FIG. 2), a working condition real-time display interface of the hose reel irrigator (FIG. 3). The parameter setting interface of the hose reel irrigator is used to set the nozzle inlet pressure of the hose reel irrigator, the reel back speed of the PE pipe, and the number of the GPRS wireless transmission module 6 communicated with the mobile phone client APP 7. The working condition real-time display interface of the hose reel irrigator is used to display the current nozzle inlet pressure sent by the GPRS wireless transmission module 6, the current reel back speed of the PE pipe, the set reel back speed of the PE pipe, the set nozzle inlet pressure, the battery current, the battery. voltage, the battery capacity, the reel back speed error, the pressure error, the uncoiled length of the PE pipe, the number of coiled turns, the number of coiled layers, the gear ratio, the working time and the remaining time. As shown in FIG. 2, the mobile phone client APP 7 is initialized after booting, and the short message mode is selected to enter the user parameter setting interface. The user sets the nozzle inlet pressure and the reel back speed of the PE pipe according to the actual needs, inputs the SIM card number of the corresponding GPRS wireless transmission module 6, clicks the connection button, and clicks the send button after confirmation. Then the information set by the user will be packaged by means of short message and sent to the GPRS wireless transmission module 6 of the specified number. As shown in FIG. 3, the real-time incoming pressure of the hose reel irrigator collected by the pressure transmitter 5 is input to the pressure PID controller when the hose reel irrigator 2 is in operation. Parameters such as the current nozzle inlet pressure calculated by the local and the frictional resistance loss models of the PE pipe, the current reel back speed of the PE pipe measured by the encoder 10, the set reel back speed of the PE pipe, the set nozzle inlet pressure, the battery current, the battery voltage, the battery capacity, the reel back speed error, the pressure error, the PE pipe uncoiled length, the number of coiled turns, the number of coiled layer, the gear ratio, the working time and remaining time are sent to the GPRS wireless transmission module 6 through the serial port 2 of the microprocessor controller module 1. The GPRS wireless transmission module 6 is added the data header, the check code, the short message serial number, and then transmitted to the mobile phone client APP 7. After receiving the short message, the mobile phone client APP 7 parses out the packaging information and displays it in the real-time display interface of the working condition. The user can control the operation of the hose reel irrigator 2 in real time according to FIG. 3. After the operation for a period of time, the set value of the nozzle inlet pressure and the reel back speed of the PE pipe can be increased or decreased according to the actual irrigation effect.

According to the local and frictional loss models of the PE pipe for the hose reel irrigator, the nozzle inlet pressure is obtained by subtracting the pressure loss of the PE pipe from the incoming pressure of the machine, and the pressure loss of the PE pipe comprises a dynamically changing uncoiled portion and a helically coiled portion, which are obtained from the test. Since the existing calculation model cannot entirely accurate calculate the pressure loss of the coiled PE pipe, the method of measuring the pressure loss data of PE pipes with different specifications and different lengths in advance is more reliable. During the test, pressure gauges are installed at the machine inlet and the nozzle inlet, and a flow meter is installed between the water supply pump and the inlet of hose reel irrigator. Firstly, the PE pipe is completely pulled out and uncoiled, so that the number of coiled turns C is 0. The irrigator incoming pressure p10 is measured, the difference between the incoming pressure of the irrigator and the nozzle inlet pressure under different working flows Qi (i=0, 1, 2 . . . ) is measured, then p10=f(Qi) and $\Delta p10$=f(Qi) are obtained. Secondly, the PE pipe is coiled one turn (C=1) onto the reel. The incoming pressure of the irrigator p11 is measured, the difference between the incoming pressure of the irrigator and the nozzle inlet pressure under different working flows Qi (i=0, 1, 2 . . . ) is measured, then p11=f(Qi) and $\Delta p11$=f(Qi) are obtained. Thirdly, the PE pipe is coiled 2 turns (C=2), 3 turns(C=3), . . . , until the PE pipe is completely coiled onto the reel. In this way, the pressure loss data p1C=f(Qi) and $\Delta p1C$=f(Qi) are obtained, when the PE pipe with a certain specification is coiled in different turns. Using the same method, a dynamic pressure loss database of PE pipes with different specifications can be established. In actual use, the corresponding flow rate Q at that time is determined by p1C=f(Qi) from the current pressure value p1C of the number of coiled turns of the PE pipe, and the compensation value and the correction value of the irrigator incoming pressure are determined by $\Delta p1C$=f(Qi). The control pressure of the pump motor frequency converter is reset by the wireless data transmission module, then the water pump motor is controlled to increase the water supply pressure to compensate the inlet pressure, so that the nozzle pressure is constant.

Figure 4:
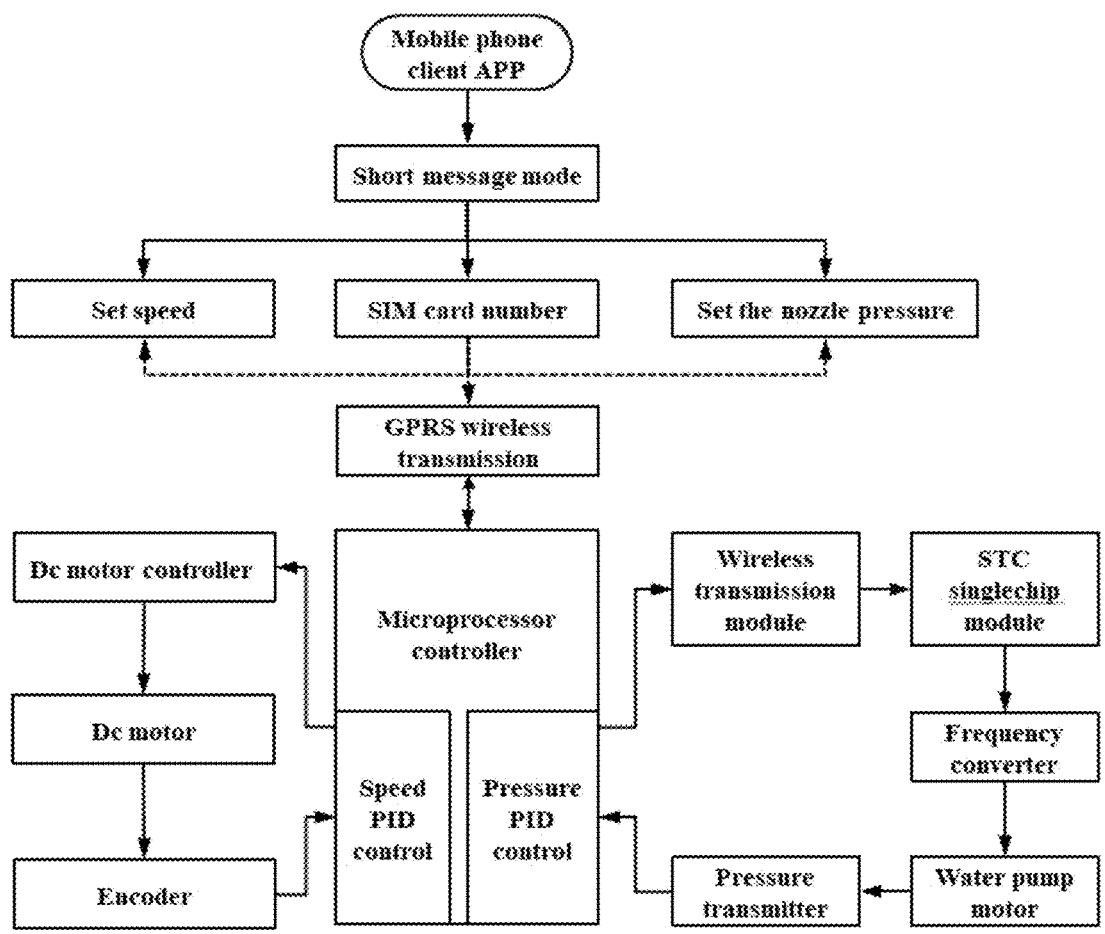
FIG. 4 is a flow chart of the wireless control system operation.

A flow chart of the wireless interconnection control system for improving sprinkler irrigation uniformity of hose reel irrigator with electric drive is shown in FIG. 4. After the speed and pressure value in the mobile phone client APP 7 is set by user, the hose reel irrigator 2 performs the sprinkler irrigation with high uniformity under the effect of the reel back speed PID closed loop for the PE pipe and the irrigator incoming pressure PID closed loop.

The practical embodiments of this system are as follows:

Step 1): After the initialization, the mobile phone client APP 7 selects the short message mode and enters the operation parameter setting interface of the hose reel irrigator. The user sets the reel back speed of the PE pipe and the nozzle inlet pressure as required, and inputs the SIM card number in the corresponding GPRS wireless transmission module 6. After the setting is completed, the connection between the GPRS wireless transmission module 6 and the mobile APP client 7 is established;

Step 2): The mobile phone client APP enters the real-time working condition display interface, and the microprocessor controller module 1 starts the sprinkler irrigation after obtaining the current speed, pressure and other data;

Step 3): The microprocessor controller module 1 calculates the corresponding incoming pressure of the hose reel irrigator according to the set nozzle inlet pressure, the local and the frictional resistance loss models of the PE pipe, and then compares the real-time pressure value sample transmitted from pressure transmitter 5 to conduct pressure PID calculation, The microprocessor controller module 1 remotely transmits the pressure calculation result to the STC singlechip module 12 through the wireless data transmission module 13, the STC singlechip module 12 transmits this pressure calculation result to the frequency converter 3, and to control the rotation speed of the water pump motor 4 to adjust the incoming pressure of the hose reel irrigator.

Step 4): After the microprocessor controller module 1 obtains the speed of the brushless DC motor 9, the PID operation is performed according to the speed value set by the mobile phone APP client 7 and the real-time rotational speed of the brushless DC motor measured by the encoder 10, and then to calculate the result to adjust the reel back speed of the PE pipe through the PID speed controller;

Step 5): The real-time nozzle inlet pressure and the brushless DC motor speed data are sent to the mobile phone client APP 7 via the GPRS wireless transmission module 6 in the short message mode, and then the user can realizes the full-time wireless remote control of the operation of the hose reel irrigator 2;

The embodiment is a preferred embodiment of the present invention, but the present invention is not limited thereto. Any obvious modifications replacements or variations that can be made by the persons skilled in the art without departing from the essential contents of the present invention are intended to be within the protection scope of the present invention.

The invention claimed is:

1. A wireless interconnection control system for improving sprinkler irrigation uniformity of hose reel irrigator with electric drive, characterized in that, it comprises a microprocessor controller module, a wireless data transmission module, a STC singlechip module, a frequency converter, a water pump motor, a pressure transmitter, a GPRS wireless transmission module, a mobile phone client APP, and an encoder; the microprocessor controller module communicates with the wireless data transmission module through the USART serial port, and the wireless data transmission module uses the USART serial port to communicate with the STC singlechip module; the STC singlechip module is connected to the frequency converter through the I/O port, the frequency converter is installed vertically on the metal base of the water pump motor starter, and the water pump motor is connected to the water source and the hose reel irrigator through the water pipe; the input end of the microprocessor controller module is connected to the pressure transmitter, and the pressure transmitter is installed on the outer wall of the hose reel irrigator; the microprocessor controller module is connected to the GPRS wireless transmission module through a serial port, and the GPRS wireless transmission module communicates with the mobile phone client APP; the microprocessor controller module is further connected to the brushless DC motor controller and the brushless DC motor through the I/O port; the encoder is mounted on the output shaft of the brushless DC motor, and connected to the input end of the microprocessor controller module.

2. The wireless interconnection control system for improving sprinkler irrigation uniformity of hose reel irrigator with electric drive according to claim 1, characterized in that, the microprocessor controller module includes a serial port transceiver module, a speed control signal conditioning module, and an alarm monitoring module; the serial port transceiver module is configured to implement communication between the microprocessor controller module and the frequency converter and the GPRS wireless transmission module; the speed control signal conditioning module, the brushless DC motor and the brushless DC motor controller form a speed Proportion Integration Differentiation Controller to adjust the brushless DC motor speed; the alarm monitoring module monitors a status of the Polyethylene Pipe and the nozzle inlet pressure when the hose reel irrigator is in operation, and alerts a user when an abnormal situation occurs.

3. The wireless interconnection control system for improving sprinkler irrigation uniformity of hose reel irrigator with electric drive according to claim 2, characterized in that, the PE pipe state includes an uncoiled length, a number of coiled layers, and a number of coiled turns.

4. The wireless interconnection control system for improving sprinkler irrigation uniformity of hose reel irrigator with electric drive according to claim 2, characterized in that, the nozzle inlet pressure is obtained by subtracting a pressure loss of the PE pipe from an incoming pressure of the machine, and the pressure loss of the PE pipe comprises a dynamically changing uncoiled portion and a helically coiled portion, which are obtained from a test; during the test, pressure gauges are installed at the machine inlet and the nozzle inlet, and a flow meter is installed between the water supply pump and the inlet of hose reel irrigator; firstly, the PE pipe is completely pulled out and uncoiled, so that the number of coiled turns C is 0, the irrigator incoming pressure $p_{10}$ is measured, the difference between the incoming pressure of the irrigator and the nozzle inlet pressure under different working flows $Q_i$ ($i=0, 1, 2 \ldots$) is measured, then $p_{10}=f(Q_i)$ and $\Delta p_{10}=f(Q_i)$ are obtained; secondly, the PE pipe is coiled one turn (C=1) onto the reel, the incoming pressure of the irrigator $p_{11}$ is measured, the difference between the incoming pressure of the irrigator and the nozzle inlet pressure under different working flows $Q_i$ ($i=0, 1, 2 \ldots$) is measured, then $p_{11}=f(Q_i)$ and $\Delta p_{11}=f(Q_i)$ are obtained; thirdly, the PE pipe is coiled 2 turns (C=2), 3 turns (C=3), $\ldots$, until the PE pipe is completely coiled onto the reel, in this way, the pressure loss data $p_{1C}=f(Q_i)$ and $\Delta p_{1C}=f(Q_i)$ are obtained, when the PE pipe with a certain specification is coiled in different turns; using the same method, a dynamic pressure loss database of PE pipes with different specifications can be established; in actual use, the corresponding flow rate Q at that time is determined by $p_{1C}=f(Q_i)$ from the current pressure value $p_{1C}$ of the number of coiled turns of the PE pipe, and the compensation value and the correction value of the irrigator incoming pressure are determined by $\Delta p_{1C}=f(Q_i)$, the control pressure of the pump motor frequency converter is reset by the wireless data transmission module, then the water pump motor is controlled to increase the water supply pressure to compensate the inlet pressure, so that the nozzle pressure is constant.

5. The wireless interconnection control system for improving sprinkler irrigation uniformity of hose reel irrigator with electric drive according to claim 1, characterized in that, the wireless data transmission module, the STC singlechip module, the frequency converter and the microprocessor controller module form a pressure PID controller to control the incoming pressure of the hose reel irrigator.

6. The wireless interconnection control system for improving sprinkler irrigation uniformity of hose reel irrigator with electric drive according to claim 1, characterized in that, the GPRS wireless transmission module includes a short message transceiver module, which interacts with the mobile phone client APP to work with various working condition information of the hose reel irrigator.

7. The wireless interconnection control system for improving sprinkler irrigation uniformity of hose reel irrigator with electric drive according to claim 1, characterized in that, the mobile phone client APP comprises a parameter setting interface of the hose reel irrigator and a working condition real-time display interface of the hose reel irrigator.

8. The wireless interconnection control system for improving sprinkler irrigation uniformity of hose reel irrigator with electric drive according to claim 1, characterized in that, the microprocessor controller module is an STM32F103RBT6 processor, the pressure transmitter is a series AS-131 diffusion silicon pressure transmitter, the GPRS wireless transmission module adopts an ATK-SIM800C module, and the wireless data transmission module is a WSN-02 wireless data transmission module.

* * * * *